Nov. 13, 1934.     F. KINZBACH     1,980,922
SHAPER
Filed Sept. 19, 1932     3 Sheets-Sheet 1

Inventor.
Frank Kinzbach.
By Hardway & Cather
Attorneys

Nov. 13, 1934. F. KINZBACH 1,980,922
SHAPER
Filed Sept. 19, 1932  3 Sheets-Sheet 2

Inventor
Frank Kinzbach
By Hardway & Cathey
Attorneys

Nov. 13, 1934.  F. KINZBACH  1,980,922
SHAPER
Filed Sept. 19, 1932   3 Sheets-Sheet 3
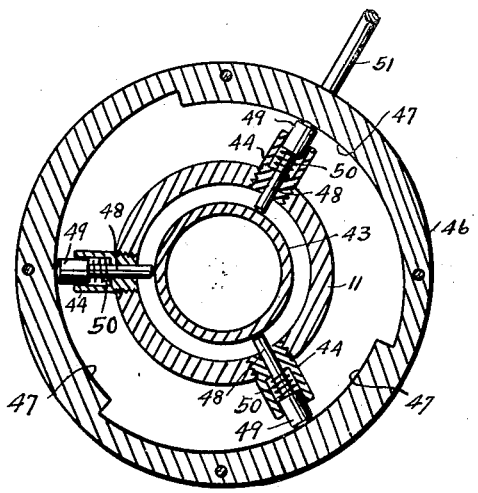
Fig. 4.
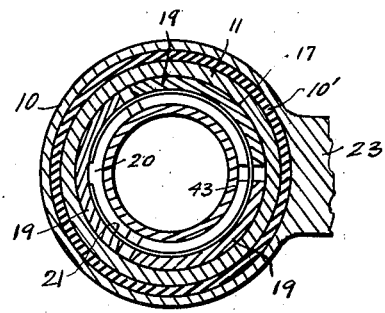
Fig. 6.
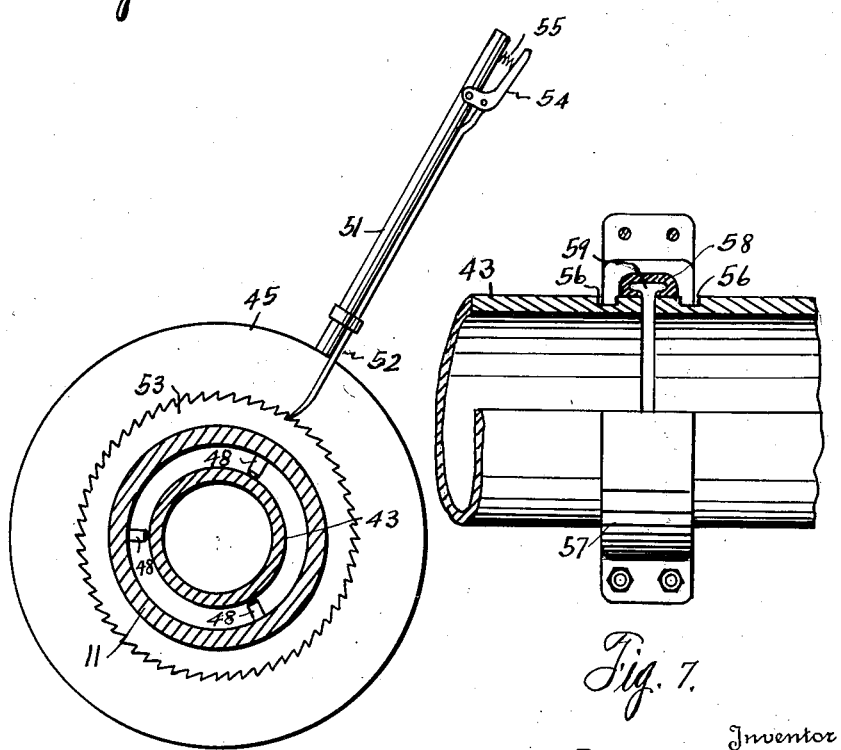
Fig. 5.
Fig. 7.
Inventor
Frank Kinzbach
By Hardway Cather
Attorney Patented Nov. 13, 1934

1,980,922

UNITED STATES PATENT OFFICE 1,980,922

SHAPER

Frank Kinzbach, Houston, Tex.

Application September 19, 1932, Serial No. 633,753

10 Claims. (Cl. 82—4)

This invention relates to a shaper.

An object of the invention is to provide a machine of the character described, specially designed for the purpose of shaping the ends of pipe and the like.

Another object of the invention is to provide a machine of the character described, whereby the worn threads at the end of a pipe section may be cut off and the end of the pipe shaped so that it may be coupled to a similar end of an adjacent section of the pipe.

The threaded ends of pipe which have been used often become worn and the threads destroyed or injured so that a tight joint can not be formed between adjacent sections of the pipe when connected into a line. This is particularly true of pipe lines and other similar lines for conveying fluid under pressure. In such case the threaded ends of the pipe sections must be cut off and the ends of the sections reshaped so that the adjacent ends of adjoining sections of the line may be coupled together in such manner as to form fluid tight joints, and it is the prime object of this invention to provide a machine for so shaping said ends of the sections of used or worn pipe and for similar purposes.

With the above and other objects in view this invention has particular relation to certain novel features of construction, operation and arrangement of parts, an example of which is given in this specification and illustrated in the accompanying drawings, wherein:—

Figure 4 shows a sectional view taken on the line 4—4 of Figure 1.

Figure 5 shows a sectional view taken on the line 5—5 of Figure 1.

Figure 6 shows a sectional view taken on the line 6—6 of Figure 1, and Figure 7 shows a fragmentary side view, partly in section, showing adjacent ends of the reshaped pipe as coupled together.

Figure 1:
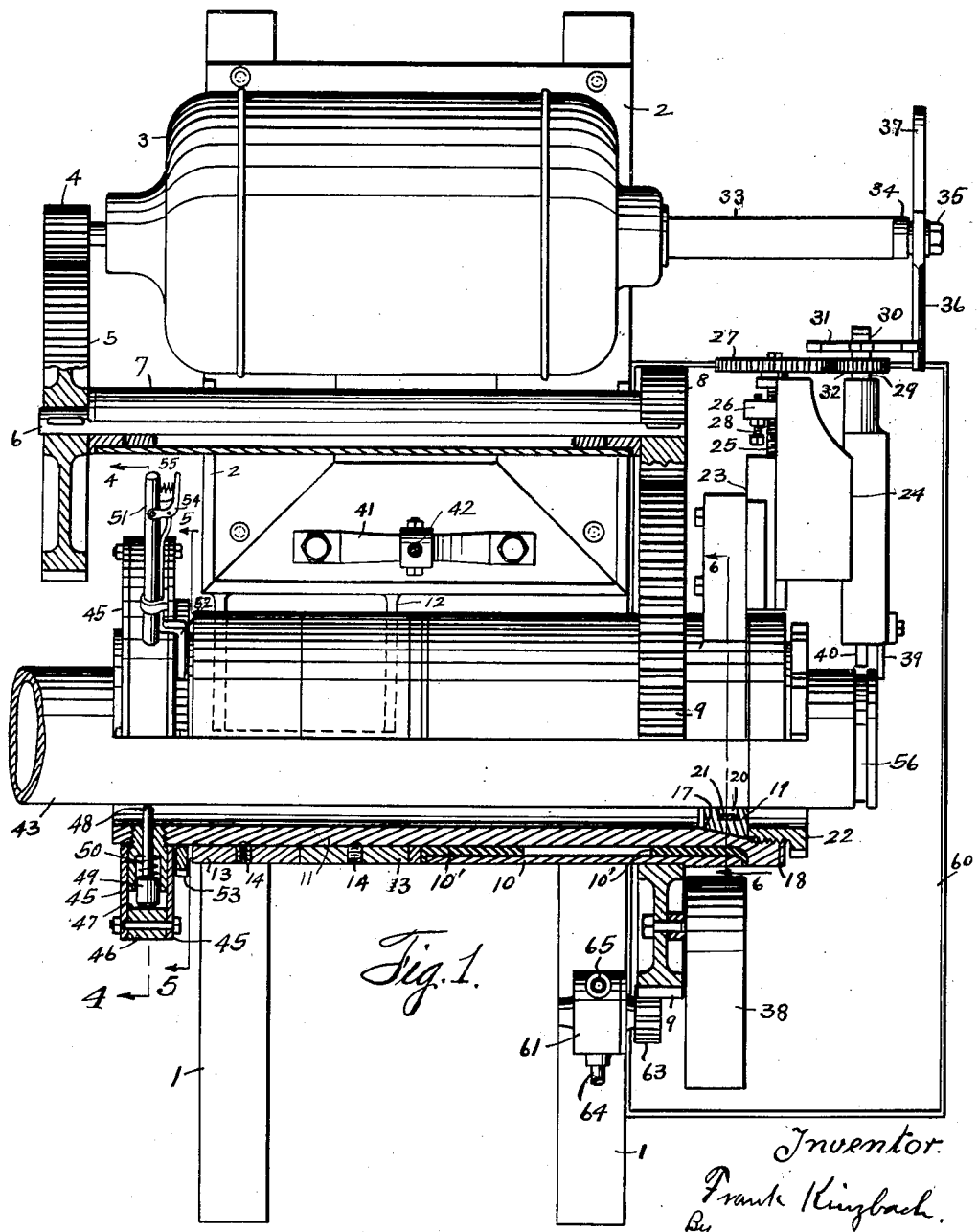
Figure 1 shows a plan view of the apparatus partly in section.
Figures 2, 3:
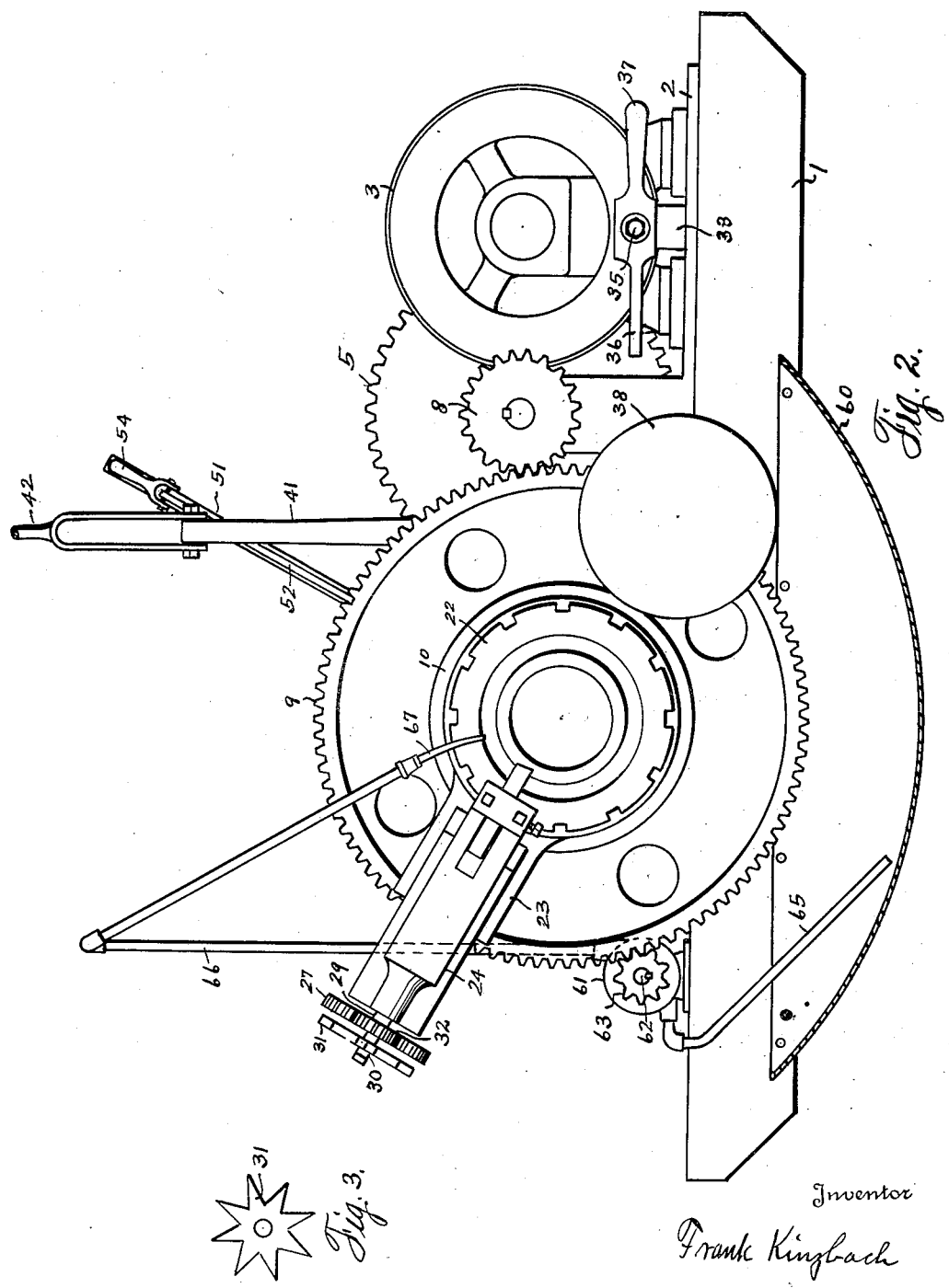
Figure 2 shows a side view thereof, partly in section.
Figure 3 shows an elevation of a star wheel employed.

Referring now more particularly to the drawings wherein like numerals of reference designate similar parts in each of the figures, the numerals 1, 1 designate the supporting skids mounted on which there is a suitable base 2 forming means for connecting the skids together and mounted on this base there is a suitable motor 3, fixed on the shaft of which there is a spur gear 4 which is in mesh with and drives the larger spur gear 5 which, in turn, is fixed on the corresponding end of a counter shaft 6. This last mentioned shaft is inclosed by a tubular housing 7 which is suitably supported on the base 2. The opposite end of the shaft 6 has the spur gear 8 fixed thereon which is in mesh with and drives the large spur gear 9 which surrounds and is fixed to the bearing sleeve 10. There is a cylindrical barrel 11 which is supported by a suitable bracket 12 which is preferably formed integrally with the supporting base 2, said barrel 11 being arranged parallel with the shaft 6. This barrel, as shown, is surrounded by the circular clamps 13, 13 and which in turn are attached to the bracket 12 and the barrel is secured against rotation in said clamp 13 by means of the set screws 14. The bearing sleeve 10 and the circular clamps 13, 13 are in alignment and substantially surround and inclose the barrel 11 from end to end. The bearing sleeve 10 turns on suitable bushings 10', 10', formed of brass or other similar material and the said bushings form inside linings for said bearing sleeve 10.

The barrel 11 at one end is formed with an inside flared seat 17 and beyond said seat is provided with the internal threads 18. There are the sectional slips 19 arcuate in cross section and whose outer sides taper to conform to the taper of and to fit within the seat 17 and the inner sides of the slips have the aligned arcuate grooves 20 to receive the flexible spring 21 which normally holds said slips expanded. There is a gland 22 screwed into the threads 18 and whose inner end abuts the outer ends of the slips 19 whereby said slips may be forced inwardly and contracted by the seat 17, or permitted to move outwardly on said seat into expanded position. The bearing sleeve 10 extends outwardly beyond the gear 9. Attached to and extending radially from said extended end there is the guide 23, and slidingly mounted on said guide there is a tool holder 24. An outwardly threaded shaft 25 has a swiveling connection with said guide and is threaded through a tapped bearing 26 carried by the tool holder and fixed on the outer end of said shaft there is a spur gear 27. The bearing 26 carries the inwardly extended adjustable stop 28 arranged to abut the outer end of the guide 23 to limit the inward movement of the tool holder. There is a spindle 29 extending outwardly from the tool holder 24 and parallel with the shaft 25 and rotatably mounted on this spindle there is the hub 30 fixed on which there is the star wheel

31 and the spur gear 32 which is in mesh with and drives the spur gear 27.

Extending outwardly from, and secured to the base 2, there is a bracket 33 whose outer end is upturned as at 34 and clamped to said upturned end by the clamp bolt 35 there is an actuating rod 36 arranged in the path of said star wheel and whose opposite end is extended forming the handle 37.

Opposite the tool holder, and bolted to the gear wheel 9, there is a counter weight 38.

As shown the inner end of the tool holder 34 is provided with the knife 39 and with the bit 40, spaced inwardly from said knife. However, any type of cutting tool may be inserted in the tool holder depending upon the character of work to be done. Rotation is imparted to the shaft 6 by the motor 3 and from said shaft to the gear 9 and the sleeve 10 will be thereby rotated and the tool holder 24 revolved. Upon each revolution of the tool holder a point of the star wheel 31 will engage the actuating rod 36 and said star wheel and the gear 32 will be partially rotated, thus transmitting a partial rotation to the gear wheel 27 and the shaft 25 and thus gradually moving the tool holder 24 inwardly toward the work until the stop 28 engages the outer end of the guide 23, and upon the next engagement of the star wheel 31 with the rod 36 said rod will be forced around on the clamp bolt 35 out of the range of said star wheel and into inactive position.

In use the machine will be usually swung clear of any support. For this purpose a yoke 41 has been provided which is attached to the base 2 and to which a suitable supporting rod 42 is attached. Any suitable overhead support may be provided from which to suspend the machine during the cutting, or shaping, operation. An end of the pipe 43, to be operated on, is inserted through the barrel 11 and the machine may be readily swung into position to align the barrel 11 with the pipe to be inserted through it. When the pipe is inserted through the barrel the slips 19 are in their outer or expanded position and thereupon the gland 32 may be screwed up against said slips to force them inwardly into contracted position in gripping relation with the pipe to hold it centered relative to the barrel 11.

At its opposite end said barrel 11 has the radial bearings 44 spaced apart therearound and on opposite sides of these bearings are the annular cheek plates 45, 45.

Bolted between the margins of these cheek plates there is the ring 46 having correspondingly inclined inside cam faces 47. There are the radial centering rods 48 which work through the bearings 44 and whose outer ends are formed with the heads 49 which are held yieldingly against the corresponding cam faces 47 by the springs 50 against which the inner ends of said heads are seated. The ring 46 may be turned at either direction by the handle 51 carried thereby. When it is desired to insert the pipe 43 the ring 46 and the cheek plates carried thereby may be turned to the left, referring to Figure 4, and the cam faces 47 will release the heads 49 and permit the centering rods 48 to move outwardly to clear the pipe and when said pipe is inserted and secured in position the ring 46 may be moved in the opposite direction and the cam faces 47 will operate to force the rods 48 inwardly to center the barrel 11 about said pipe. The ring 47 is maintained in said last named position by the dog 52 which is slidably mounted on the handle 51 and whose inner end is arranged to engage the ratchet 53 which is secured on the barrel 11 adjacent the inside cheek plate 45. The outer end of the dog 52 is attached to a pivotally mounted grip member 54 on the outer end of the handle 51 and said dog is maintained in engagement with said ratchet by the pressure of the spring 55 interposed between the handle 51 and the grip member 54.

When the pipe 43 is secured in position as above explained the motor 3 may be started and the tool holder and tools will be revolved as hereinabove explained and the tools 39, 40 forced gradually inwardly until the blade 39 severs the mutilated end of the pipe and the bit 40 forms a groove 56 therearound.

When the ends of the pipe sections are shaped, as hereinabove described, the sections may be arranged in alignment and connected together by a suitable coupling. A victaulic coupling has been shown in Figure 7 for this purpose. This coupling is formed of complemental sections 57, U-shaped in cross sectional contour and which may be bolted about the joint between the connected sections of the pipe and which have flanges that project into the grooves 56. The coupling has a suitable inside resilient packing ring 58 having an inside annular channel 59 to receive the pressure of the fluid being conducted whereby said packing is forced outwardly against the coupling and inwardly against the pipe ends to form a fluid tight joint.

Arranged underneath the tool holder, and secured to the adjacent skid 1, there is a suitable water or oil container 60. Mounted on said last mentioned skid there is a pump 61 having the extended shaft 62 on which is mounted the spur gear 63 which is in mesh with and driven by the gear 9. The pump has an intake pipe 65 which is submerged in the liquid in the container 60 and the discharge line 66, which terminates in a swinging nozzle 68, which may be adjusted so as to discharge a liquid such as oil or water onto the work, to wash away the cuttings and to keep the work and the working tools cool.

The drawings and description disclose what is now considered to be a preferred form of the invention by way of illustration only while the broad principle of the invention will be defined by the appended claims.

What I claim is:—

1. A shaper for pipe and the like comprising a barrel shaped to receive the pipe, means for centering the pipe at one end of the barrel, means for centering and clamping the pipe at the other end of the barrel, a tool holder arranged to revolve about said barrel, means for revolving said holder, a tool on the holder arranged to operate against the pipe, means for feeding the tool to the work, a liquid container, pump means operatively connected with said revolving means and arranged to take liquid from said container and deliver the same to the work.

2. A shaper for pipe and the like including a support, a cylindrical barrel on the support shaped to receive a pipe and having a flared seat at one end, pipe engaging slips on said seat, means for moving and holding said slips on said seat in gripping relation with the pipe in said barrel, pipe centering means at the other end of the barrel, means for actuating said centering means into and out of active relation with the pipe, a tool holder mounted to revolve about the barrel, a tool carried by the holder arranged to operate on said pipe, means carried by said holder to feed the tool to the work and means for intermittently actuating said feeding means.

3. A shaper for pipe and the like including a support, a cylindrical barrel on the support shaped to receive a pipe and having a flared seat at one end, pipe engaging slips on said seat, means for moving and holding said slips on said seat in gripping relation with the pipe in said barrel, pipe centering means at the other end of the barrel, means for actuating said centering means into and out of active relation with the pipe, a tool holder mounted to revolve about the barrel, a tool carried by the holder arranged to operate on said pipe, means carried by said holder to feed the tool to the work, means for intermittently actuating said feeding means, and adjustable stop means for limiting the movement of the tool holder and tool toward the work.

4. A machine for shaping the end of a pipe or similar object comprising a tubular support to receive the pipe, a bearing sleeve rotatable on said support, a tool holder on said sleeve, a tool carried by said holder, a motor, means for operatively connecting the motor to the sleeve whereby said sleeve may be rotated and tool holder and tool revolved about the work, means for anchoring the pipe in the support, said anchoring means including pipe engaging slips in the support and means for actuating said slips into gripping relation with the pipe, radially movable centering means mounted on said support, means for actuating said centering means inwardly into active position against the pipe and for releasing the same to permit the outward movement thereof.

5. A machine for shaping the end of a pipe or similar object comprising a tubular support to receive the pipe, a bearing sleeve rotatable on said support, a tool holder on said sleeve, a tool carried by said holder, a motor, means for operatively connecting the motor to the sleeve whereby said sleeve may be rotated and tool holder and tool revolved about the work, means for anchoring the pipe in the support, said anchoring means including pipe engaging slips in the support and means for actuating said slips into gripping relation with the pipe, radially movable centering means mounted on said support, means for actuating said centering means inwardly into active position against the pipe and for releasing the same to permit the outward movement thereof, and yieldable means normally tending to move said centering means outwardly.

6. A machine for shaping the end of a pipe or similar object comprising a tubular support to receive the pipe, a bearing sleeve rotatable on said support, a tool holder on said sleeve, a tool on said holder, means for rotating said sleeve to revolve the tool holder and tool about the work, means for anchoring said pipe in said support in position to be operated on by said tool, adjustable centering rods for adjusting the pipe in said support, means for intermittently moving the tool inwardly into operative relation with the work.

7. A machine for shaping the end of a pipe or similar object comprising a tubular support to receive the pipe, a bearing sleeve rotatable on said support, a tool holder on said sleeve, a tool on said holder, means for rotating said sleeve to revolve the tool holder and tool about the work, means for anchoring said pipe in said support in position to be operated on by said tool, adjustable means for centering the pipe in the support, means for intermittently moving the tool inwardly into operative relation with the work, and adjustable means for limiting such movement of the tool holder and tool.

8. A shaper for pipe, and the like, including a barrel shaped to receive the pipe, means for centering and clamping the pipe in the barrel, a tool holder and tool therein mounted to revolve about the barrel, and means for swingably mounting the shaper during the operation thereof to permit the alignment of the barrel with the pipe to be received by said barrel.

9. A shaper for pipe and the like including a tubular support shaped to receive a pipe, a tool holder mounted to revolve about said support, a tool on said holder, means for revolving the holder, means for feeding the tool to the work, means for maintaining the shaper suspended to permit the alignment of said support with the pipe to be received by said support and to permit the movement of the machine from the work and means for centering and clamping the pipe in said support.

10. A pipe cutting and shaping machine comprising a barrel shaped to receive the pipe, means for centering and clamping the pipe in the barrel, a tool holder and tool therein mounted to revolve about the barrel, and means for swinging the machine whereby said machine may be bodily swung into position for operating on the pipe and swung into inactive position relative to the pipe.

FRANK KINZBACH.